Jan. 16, 1962 H. D. CRANDON 3,016,794
IMPROVEMENTS IN PROJECTION SCREENS
Filed March 8, 1957 4 Sheets-Sheet 1

INVENTOR
HARRY D. CRANDON
BY
ATTORNEYS

INVENTOR
HARRY D. CRANDON
ATTORNEYS

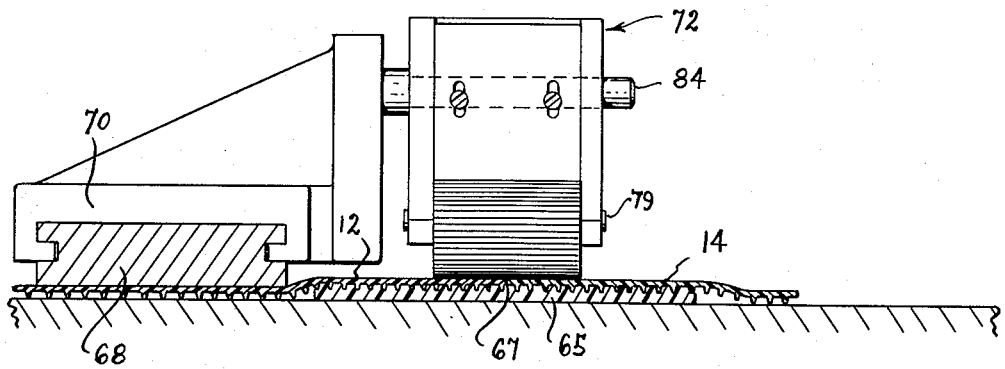
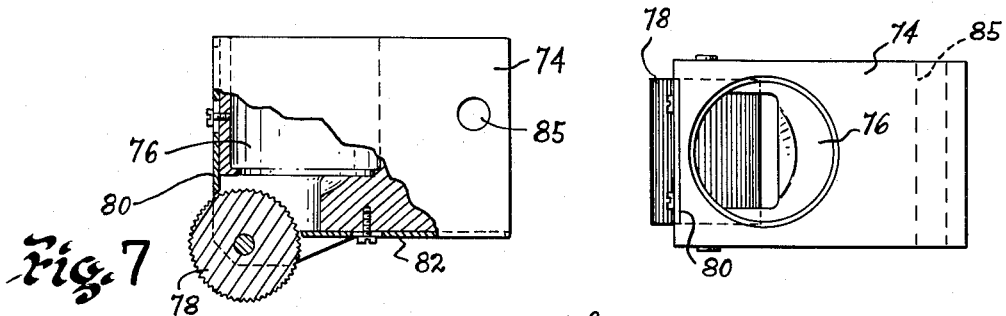
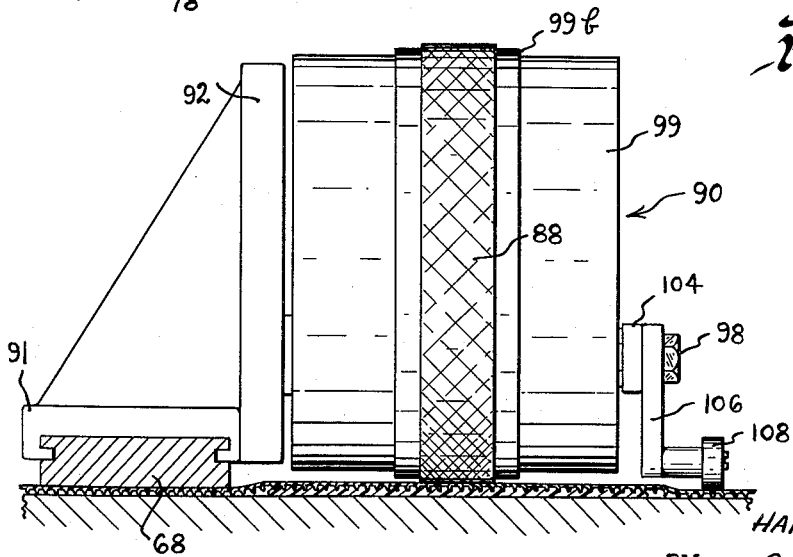

INVENTOR
HARRY D. CRANDON
ATTORNEYS

United States Patent Office 3,016,794
Patented Jan. 16, 1962

3,016,794
IMPROVEMENTS IN PROJECTION SCREENS
Harry D. Crandon, Woodstock, Conn., assignor to American Optical Company, Southbridge, Mass., a voluntary association of Massachusetts
Filed Mar. 8, 1957, Ser. No. 644,949
2 Claims. (Cl. 88—28.90)

This invention relates to motion-picture projection screens and the like.

Present-day commercial projection screens are often of considerable size and, in some cases, as much as six to eight times the size of conventional motion-picture screens of a few years ago. Accordingly, it has been found not only convenient and desirable to be able to make such a projection screen by first forming a plurality of elongated strips or sections of sheet material and to thereafter secure these strips together to form a full size screen but also desirable to have this full size screen of such a flexible nature in its finished condition as to allow same to be rolled for transportation to the location at which same is to be used.

For best performance of a screen of this type, a number of different conditions should be satisfied. For example, the material of which the screen is made should provide as high a degree of reflectivity as possible, in order to lessen the demands upon the associated projector, should be fire-resistant, and should be of a tough, durable nature and should not discolor with age. Not only should be material of which the screen is made be strong enough to withstand the considerable amounts of tension placed thereon when same is peripherally laced to an outer vertically disposed supporting frame but also the seams between adjacent strips should be sturdy enough to withstand such tensioning and should not yield or "creep" even over an extended period of use and in relatively warm theater conditions.

While high reflectivity from the reflective surface of the screen is desirable, the surface should, nevertheless, have such diffusing characteristics free from all shininess at all locations thereon as to reflect the light received from the projector as uniformly as possible toward all parts of the associated audience area. Of course, no seam or joint between joined strips should be visible from the audience area and, furthermore, no buckling or shininess due to the joining of the strips should appear; for persons in the audience area will be quick to detect any imperfections in such a screen surface, even though slight, when parts of the screen are brightly lighted by images being projected thereon.

It is desirable in connection with flexible projection screens of the type being described herein to provide a large number of small sound perforations in the sheet material of which the screen is to be formed so that when the screen is positioned for use, sound-reproducing devices may be placed behind different parts of the screen for producing directional sound effects. The method of joining edges of adjacent strips for forming such a flexible screen having sound perforations, of course, must be such that the locations of the joined edges will not be detectable from the audience area notwithstanding the fact that perforations are uniformly dispersed therein.

Another condition to be considered in the formation of such flexible screens arises from the fact that at times large screens are purposely horizontally concavely curved with reference to the audience areas and projectors associated therewith, and while this curving may be either slight or considerable and may be either regular or irregular, nevertheless, it is highly desirable to be able to avoid therein a condition sometimes referred to as "re-illumination" or "cross-illumination." Furthermore, this prevention of "cross-illumination" should be accomplished without loss of said high reflectivity and uniformity of light distribution to all parts of the audience area as mentioned above. The term "re-illumination," or "cross-illumination," as used herein, is intended to mean a condition wherein some of the image-forming light projected onto the projection screen is reflected or diverted by the screen to other parts of the screen, with the result that this undesirable stray light tends to "wash out" or deteriorate the image on the screen.

The front surface of the screen of the present invention is provided with a predetermined configuration in order that such re-illumination will be prevented. Also, the method of forming improved projection screens as described herein is arranged to effectively join adjacent edges of the strips of flexible screens in such a manner that not only is said configuration retained unaltered but also at the same time the high reflectivity, strength, durability, and good light distribution from all parts of the screen to the audience area will be obtained and, at the same time, good fire-resistant qualities will be obtained.

Different methods of joining a plurality of elongated strips of sheet material to form a flexible screen have been tried heretofore but each has had its limitations, with the result that same will not suffice in the construction of screens of the type herein described. Securing the adjacent edges of strips together as by stitching or sewing has left visible joints which had to be later covered. The use of a ribbon cemented by means of an air-drying cement to adjacent edge portions of strips of sheet material did not prove successful since shrinkage or buckling effects along the seam occurred and could not later be removed. Rubber base cements also have proved unsatisfactory since "creep" at the joints has occurred, particularly when the tensioned screen has been subjected to excessive summer temperatures. And, further, certain earlier flexible screen constructions have not provided the fire-resistance normally required thereof.

The method of manufacture of the present invention, however, has overcome the several difficulties mentioned above and, at the same time, has successfully provided large size flexible fire-resistant projection screens formed of a plurality of strips of sheet material secured together and having not only the high reflectivity and uniform light distribution desired but without detrimental effects due to re-illumination occurring and without having the seams or joints between the adjacent strips or sections, whether the sheet material be perforated for sound or not, be visible from any part of associated audience areas.

Additionally, it is an important factor of the present invention that the method of manufacture of such projection screens should not be too expensive or difficult or time-consuming to put into effect and, furthermore, that the resultant screen should not only have desirable and lasting characteristics but, additionally, should be suitable for easy transportation and installation in its finished form even though same may be of a considerable size.

It is, accordingly, an object of the present invention to provide a new type of projection screens of appreciable size and comprising a plurality of elongated strips or sections secured together to affect a strong, durable, finished screen which has a relatively high total reflectivity, good fire resistance, provides relatively uniform light distribution when considered from the various locations within a relatively wide predetermined audience area and which will not discolor or deteriorate over an extended period of time.

It is a further object of the present invention to provide projection screens having the aforementioned characteristics and which screens are of a flexible type so that same may be readily rolled and transported and thereafter supported in a tensioned position within a rigid vertically disposed peripheral frame, said screen being formed by a plurality of strips of flexible sheet material joined together in edge-to-edge abutting relation by suitable backing means which is of such a character that the joints between adjacent strips do not show, the areas near the seams show no shrinkage wrinkles, and no glazed surface areas adjacent said seams will be manifest; and, furthermore said joints should not allow the secured edges of the sheet material to "creep" or yield under the tension or the weight of the suspended screen even after an expanded period of time while exposed to high ambient air temperatures.

It is a further object of the invention to provide projection screens of the above-mentioned character which have carefully controlled surface configurations or constructions which will prevent any appreciable cross-illumination of any part of the screen by projected light reflected or diverted thereto from other parts of said projection screen.

It is an object to provide projection screens of the above character which are perforated for sound transmission and which screens do not have visible therein the seams joining the individual strips or sections together.

Other objects and advantages of the invention will become apparent from the detailed description which follows when taken in conjunction with the accompanying drawing in which:

FIGS. 7 and 8 are side and plan views respectively of cement-applying means for use in carrying out the method;

FIG. 9 is a vertical view, partly in section, showing the cement-applying means in use;

FIGS. 10 and 11 are end and side elevational views, respectively, showing sealing and guide means in use during a step of the method.

Since present-day commercial motion-picture projection screens may be as much as 28 feet or more in height and as much as 60 feet or more in width, it is desirable to be able to make up such a screen by first forming a plurality of elongated strips of flexible sheet material and thereafter secure these strips together in side-by-side relation to form a full size screen which can be rolled and transported conveniently to its theater location without difficulty or injury. It has been found convenient in making screens of this type and approximate size, and while following the teachings of the present invention, to use elongated strips of specially prepared sheet material which are each approximately fifty inches in width and to secure a plurality of these sheets together in a new and improved manner so as to produce a screen having, for purposes to be hereinafter described, its strips extending vertically. However, in describing both the physical characteristics of the strips and the technique by which the adjacent strips are joined, it is believed that a small portion of a projection screen such as that shown at 10 in FIG. 1 will be sufficient. This small portion, it will be noted, has purposely been taken so as to show not only a pair of adjacent elongated strips 12 and 14 but also a butt joint 16 therebetween formed by straight edge portions 18 and 20 and a tape or ribbon 22 secured to both strips rearwardly of said joint.

Figure 1:
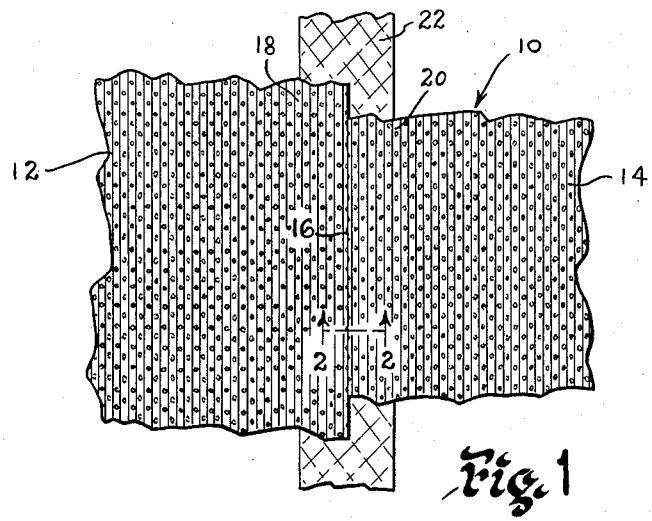
FIG. 1 is a plan view of a small portion of a projection screen embodying the invention.
Figure 2:
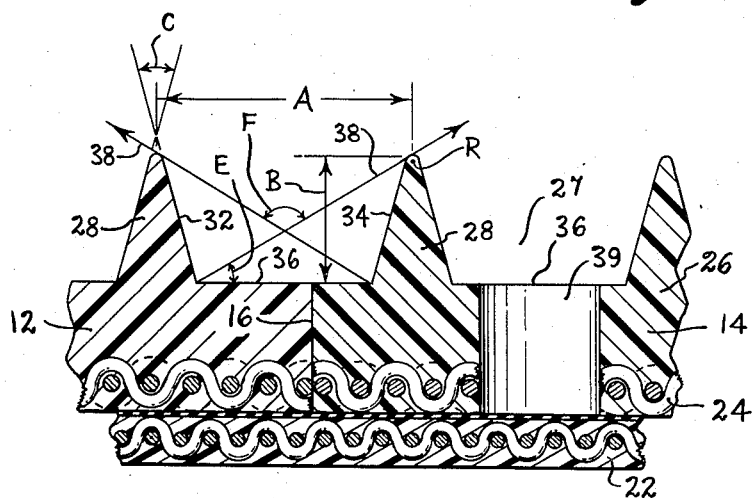
FIG. 2 is a cross-sectional view taken upon section line 2—2 of FIG. 1 and considerably enlarged to show details thereof.

As best shown in FIG. 2, the flexible sheet material of which each elongated strip 12 and 14 is formed comprises a woven fabric reinforcing layer 24 which has been coated or impregnated by a thermoplastic material 26 so that not only is the fabric completely covered thereby but also so that a quantity of thermoplastic will be disposed on the upper side thereof which is sufficient to allow a plurality of parallel grooves or channels 27 separated by upstanding ribs 28 to be formed therein; as by the application of suitable heat and pressure. This is done after careful treatment of the front surface of the sheet material, as will be later described, to render same diffusing or as free from specular reflection as possible. (While a preferred form of thermoplastic sheet material is shown in FIGS. 1 and 2 and includes a woven fabric as reinforcing so as to be able to withstand large amounts of tension when in use in a projection screen, it should be here noted that at times it may be as desirable to merely make the screen forming sheet material solely of a thermoplastic material without employing any reinforcing; and very satisfactory results have been obtained when such a construction has been used.)

The channels 27 and ribs 28 are carefully and purposely arranged to extend in straight lines running parallel to each other and longitudinally of the strips of sheet material; and these ribs and grooves are carefully controlled as to height, width, spacing and contour so that they will be, on the one hand, close enough together to be beyond the resolving ability of anyone in an audience area, and, on the other hand, will be such as to cause substantially all of the light being reflected by the sheet material during use of same in a completed screen to be reflected therefrom in a carefully controlled manner.

In a preferred construction of the sheet material, the parallel ribs 28 are spaced so that their center-to-center distance A will be approximately equal to .0625 of an inch. The depth B of each channel or groove 27 formed between the adjacent ribs 28 is maintained between approximately .025 and .031 of an inch, and the slope of the side walls 34 of each rib is such as to form an included angle C equal to approximately 30 degrees. Furthermore, the free outer edge portion of each upstanding rib 28 is preferably circularly curved so as to have a very small radius, such as the radius R which has been made approximately equal to .0019 of an inch. The length of this radius, however, may be varied somewhat as long as is remains relatively small.

Thus, it will be seen that with such proportions as given above, as much as 95% of all the projected light striking the screen in any selected unitary area included between the vertices of adjacent vertically disposed ribs 28 will impinge either directly upon the pair of included sloping side walls 32 and 34 or directly upon the flat surface 36 forming the bottom of the channel 27 therebetween. Of all the light which strikes the flat surface 36 and is reflected in a diffused manner thereby, none, it will be seen, will be allowed by the adjacent upstanding ribs 28 to leave the screen in a sidewise direction which does not have at least an angular value at least equal to or greater than a predetermined minimum reflection angle E; indicated by arrow 38 relative to the flat surface 36. This directly reflected part of the light, of course, is by far the greater part of all the light being received. Some light reflected by surface 36, of course, will strike the sloping surfaces 32 and 34 before leaving the screen, but the direction at which this light is received by the sloping surfaces will be such as to direct same mostly toward the audience area.

Furthermore, a very much smaller quantity of projected light will strike each pair of sloping surfaces 32, 34 adjacent flat surface 36 and of this light, most of it, after reflection, will travel, generally toward the flat surface 36. Accordingly, when this light is also directed away from the screen, most of it will likewise bear an angular value which is at least equal to the angle E. Thus, most of the reflected light from any single unitary area including flat surface 36 and a pair of adjacent sloping rib surfaces 32 and 34 will be contained within a wide but controlled angle F facing the audience area, and, accordingly, only a very small inconsequential part of the total light which is received by the screen will be reflected by parts of the screen so as to be outside this controlled angle F.

Thus, not only can the screen material of the present invention be used with high efficiency as a "flat" screen, wherein cross-illumination is ordinarily no problem, but also efficiently in cases wherein the screen is to have a considerable amount of horizontal concave curvature. In some cases, as much as eight feet of depth between the center of a fifty-foot screen and a chord connecting its outer side edges has been used without appreciable cross-illumination.

The large number of parallel ribs and channels to be formed lengthwise of each strip of flexible sheet material can best be provided by first embossing the cylindrical working surface of a pressing roll of known type with accurately formed spaced parallel grooves having shapes complementary to the desired shapes of the channels 27 and ribs 28. The making of such a roll is a slow, expensive and painstaking task but when once completed, a great deal of thermoplastic material can be rapidly and accurately processed thereby. This may be done by first passing the thermoplastic material before it has been cut into individual long strips or sheets around a heating drum to preheat and soften the plastic after which the material passes between the embossing roll and a backing roll; the embossing roll or even both rolls being at such time continuously water cooled so as to not only form the ribs and grooves in the softened plastic but also to set the plastic with ribs and grooves "locked" therein. A preferred material for forming the woven fabric layer 24 is a balloon cloth, sail cloth or the equivalent which will provide adequate tensile strength to the sheet material according to the size of screens to be formed thereby. A preferred material for forming the thermoplastic coating is a pure white vinyl resin plastic having as high and as uniform reflectivity as can be conveniently obtained.

The process of forming a projection screen of the above character may comprise as the first step spraying onto the white vinyl plastic coated surface of the flexible sheet material into which the channels and ribs are to be pressed a thin uniform film or coating of a hydrated silica to serve as a dulling agent and allowing the coating to dry. The purpose of this thin film is to reduce as much as possible, or to even completely eliminate, all specular reflection from the surface of the vinyl material, and to provide instead a mat surface of very high reflectivity substantially free from gloss or luster even after all of the subsequent steps required for forming the screen have been performed.

The thus treated vinyl coated fabric strip material is then processed to form said parallel channels and ribs. The previously applied thin silica film, it should be noted, does not lose its luster-removing properties by the rib and channel forming step subsequently performed on the sheet material.

The ribbed sheet material is then run through suitable guide means while being perforated by suitable perforating dies or rollers (not shown) for forming a very large number of closely laterally and longitudinally spaced minute perforations preferably between the ribs 28, such as indicated at 39 in FIG. 2, therein. In this way, a very large number of small sound perforations can be rapidly and accurately made.

The strips of sheet material are then very accurately measured for relative brightness or reflectivity and matched for a difference of no greater than 1% at different parts of the same strip and the same amount along adjacent edges of adjacent strips. When strips with suitably matching edges insofar as reflectivity is concerned, have been obtained, a cutting tool in a special holder is used to accurately trim the side edges of each pair of strips which are to be joined so that the trimmed edges will be exactly parallel to the ribs on the respective strips and so that the spaces provided between each cut edge and the nearest rib on the same strip together will equal the normal spacing between ribs on the sheet material.

Figure 3:
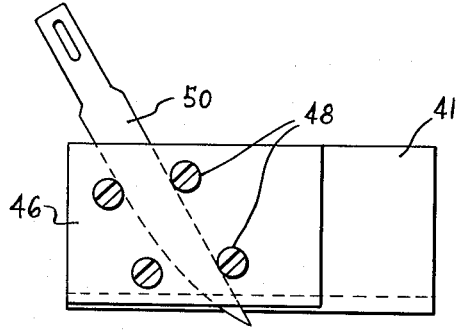
FIGS. 3 and 4 are side and front elevational views respectively of a special cutting tool used in performing the method of the present invention.
Figure 4:
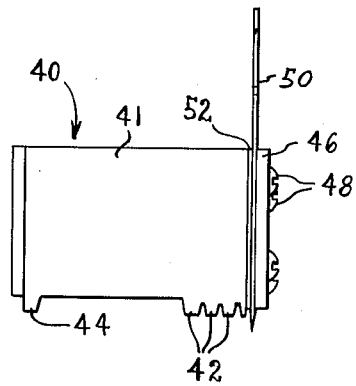

A preferred cutting tool for this purpose is shown at 40 in FIGS. 3 and 4, and comprises a holder 41 which is in the form of a small generally rectangular block of thermoplastic material or the like having an accurately formed bottom surface. The block 41 is provided with a number of accurately shaped and spaced parallel projections or runners 42 and 44 on its bottom so as to closely engage about and be slidably guided by the sloping side walls of several ribs 28 on the strip of the sheet material near the side edge thereof during accurate trimming of each strip. The formed bottom surface of the block may be either molded thereon or accurately machined to shape and polished to give a low coefficient of friction.

A clamping plate 46 is secured to one side of the holder 40 by a set of clamping screws 48 extending through the plate 46 at opposite sides of a cutting blade 50 and into threaded holes in the block. Shim means of a desired thickness, such as indicated at 52, may be used between the block and cutting blade 50 or plate 46 and cutting blade as desired in order to obtain fairly closely a suitable spacing between the tip of the blade and the nearest projection on the bottom of the block. However, as will be seen presently, this spacing is not highly critical, as long as the preferred method of trimming of the adjacent edges of each pair of elongated strips to be joined together, as described herein, is followed.

Figure 5:
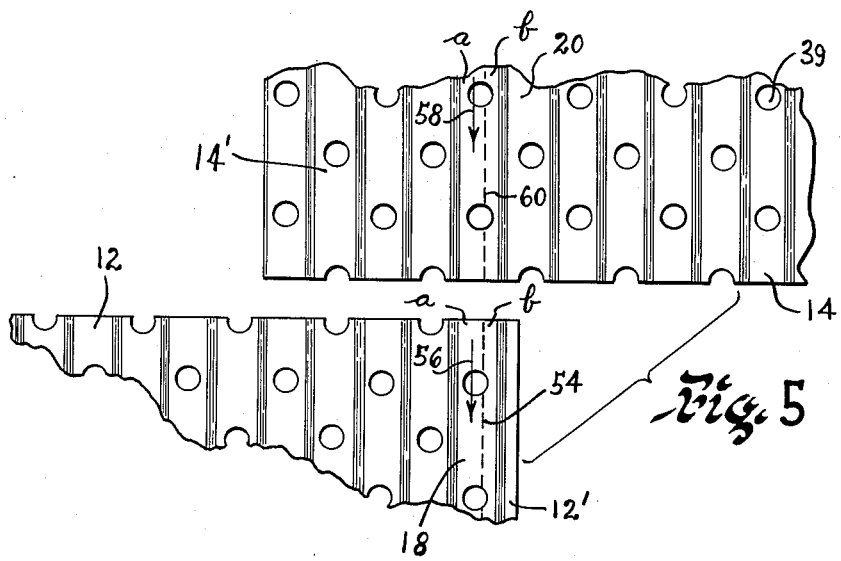
FIG. 5 is a plan view of strip of flexible sheet material considerably enlarged which are to be cut and joined together.

If reference is made to FIG. 5 wherein small parts of strips 12 and 14 which are about to be trimmed have, for convenience, been shown near each other, it will be seen that upon strip 12 is indicated by a dotted line 54 the location at which a cut for trimming the longitudinal edge 18 might be made by the cutting tool 40 if same is guided by ribs of this strip and moved in the direction indicated by the arrow 56 from one end of strip 12 to the other. While the resulting cut is spaced a distance $a$ from one adjacent rib and a distance $b$ from the other adjacent rib and distances $a$ and $b$ may be equal or unequal, nevertheless, if the strip 14 is trimmed near the adjacent side edge 20 by moving the cutting tool 40 in the same direction, as indicated by arrow 58, while being guided by ribs on the strip 14, a cut will be made along dotted line 60, which will provide like spaces $a$ and $b$ for the strip 14. It further follows, of course, that since the long, narrow trimmed-off part 12' of strip 12 is to be discarded, as is also the long narrow trimmed-off part 14' of strip 14, the strips 12 and 14 will then have, when placed in edge-to-edge abutting relation, their two nearest ribs (at opposite sides of the joint 16 thus formed) in parallel relation to each other and accurately spaced a total distance A apart.

Figure 6:
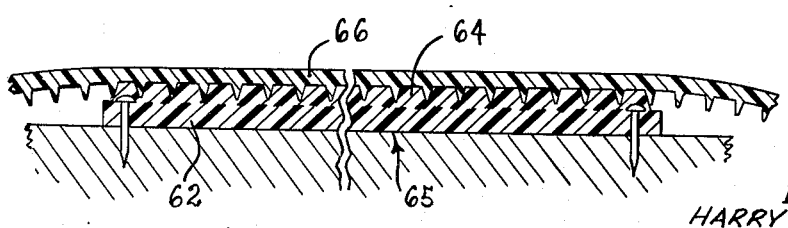
FIG. 6 is a cross-sectional view on a slightly smaller scale showing the formation of supporting means for use in carrying out certain steps of the method of the present invention.

The next step in the preferred method is that of forming an elongated grooved supporting and positioning plate which may be used while each two elongated strips of sheet material which are to be joined, such as 12 and 14, are being prepared and then joined. Such a positioning plate is shown in cross-section at 62 in FIG. 6. The plate may be formed by first placing a long flat piece or pieces of methyl methacrylate or equivalent rigid plastic material in end-to-end straight line relation on a supporting table and securing same in place so that a total length a little greater than is the length of the strips of flexible sheet material to be joined. For example, a plate ⅛ to ¼ of an inch in thickness, 3 inches in width and 30 feet long will, for most screens, be sufficient.

Upon the top surfaces of this long plate 62 is spread or calendered a layer 64 of a suitable viscous or syrupy air-hardening or heat-setting plastic material so that a thickness of 1/32 to 1/16 of an inch is produced. A long piece of ribbed flexible sheet material which has not been perforated is thereafter placed, ribs down, along the full length of this plastic layer 64, as indicated at 66, and weighted by suitable means (not shown) so that the sheet material will be held flat and with the ribs 28 thereof pressed into the viscous material until the layer 64 has hardened. A satisfactory material for the purpose may comprise a polyester resin such as one formed by condensing diethylene glycol with maleic acid and cross-linking same with styrene using 0.6% methyl ethyl ketone peroxide as the catalyst and containing 0.2% cobalt naphthenate drier to prevent air inhibition. Thereafter, the layer is allowed to harden in air. Thus, an elongated accurately grooved plate 65 will be formed.

The strips 12 and 14 of flexible perforated sheet material may now be placed ribs down, as indicated in FIG. 9, on plate 65 and arranged with their accurately trimmed abutting edges approximately centered relative to plate 65, as indicated at 67, and extending lengthwise of the grooved plate. When the ribs 28 of the two strips are correctly seated in the grooves, the trimmed edges will be firmly retained in abutting relation.

To facilitate the further carrying out of the method, a long straight edge 68 is placed upon the sheet material slightly to one side of the plate 65 and parallel thereto for guiding purposes. By use of this straight edge, a guide shoe 70 thereon and a cement-applying device 72 operatively attached to the guide shoe, it is an easy matter to apply a long straight thin coating of a suitable plastic cement to the back side of the strips 12 and 14 of flexible sheet material adjacent the abutting edges.

This cement has to be prepared with extreme care for it is required, in the seams or joints of the finished screen, to rigidly satisfy a number of extreme conditions. For example, it must be flexible. It must not contain any plasticizer which might later migrate into the vinyl plastic material of the adjacent screen strips and cause a discoloration or a softening thereof. And it must provide, when used to form a cemented horizontally disposed butt joint of the type being described herein in a ¾ inch width vertically hung test strip material, a union which will withstand without failure or creep for a period of at least three days the pull of a three pound weight, the ambient air at such time being maintained at approximately 150° temperature and a relative humidity of 50%.

The ingredients of three cements which have been found to satisfy the above requirements are given below, and it will be noted that in each case a relatively high molecular weight air drying polyvinyl resin cement has been provided:

| Ingredients | Parts by Weight | | |
|---|---|---|---|
| | #1 | #2 | #3 |
| Geon Polyblend (5.00-4.79) | 5.0 | | 5.0 |
| VYNS-3 | 8.0 | 8.0 | 7.0 |
| VYCM-3 | 4.0 | 4.0 | 3.0 |
| VYCH | | | 2.0 |
| Cyclohexanone | 8.0 | 8.0 | 8.0 |
| Methyl ethyl ketone | 60.0 | 75.0 | 75.0 |
| Methyl Cellosolve acetate | 15.0 | | |

Certain trade names are used in the above tabulations and accordingly, in order that the chemical compositions of the materials denoted thereby will be known, the following information is given:

| Trade Name | Composition |
|---|---|
| Geon Polyblend 5.00-4.79 | A blend of 70% copolymer of polyvinyl chloride and 30% butadiene rubber. |
| VYNS-3 | 90% vinylchloride and 10% vinyl acetate having an intrinsic viscosity of 0.79. |
| VYCM-3 | 91% vinylchloride and 9% vinyl acetate having an intrinsic viscosity of 1.38. |
| VMCH | 86% vinylchloride and 13% vinyl acetate having an intrinsic viscosity of 0.53. |

The cement-applying device 72 is also better shown in FIGS. 8 and 9 and consists essentially of a casing 74 having a well 76 for holding a quantity of liquid cement therein, a serrated wheel 78 journaled on a shaft 79 extending through the sides of the casing so as to have a part of the wheel engage cement into the well, and adjustable bottom and side plates 80 and 82 for control of the amount of cement which will be carried away from the well by the wheel as same is rotated. A fixed rod 84 extending outwardly from the side of the guide shoe 70 (see FIG. 9) serves to pivotally support one end of the casing 74 by engaging in opening 85 therein while the other end of the casing is supported by the wheel 78 in contact with the material being coated.

Onto the back of the sheet material and so as to contact the long narrow cement-coated area at the joint 67 will next be placed an especially prepared securing tape; prepared by a technique to be presently described. An important requirement of this tape is that it should not stretch any appreciable amount while being secured to the sheet material adjacent the edges of strips 12 and 14, and should not stretch thereafter when the screen is hung in its supporting frame and tensioned by the lacing at its outer edges. Also, it is important that the material being used to adhere the tape to the adjacent strips be such that secure but flexible seams will result and, at the same time, these seams must be such that no yield or "creep" between the tape and either strip will occur, even after an extended period of time and/or when subjected to very warm summer temperatures or the like. Furthermore, since the strips forming the screen are evenly perforated at all parts thereof for sound transmission purposes and the area behind the screen and housing the sound equipment is dark during use of the screen, it is necessary to have the perforations in the areas at which the seams are located also appear equally dark, and without having any difference in reflectivity appear in areas of the screen near the seams. Without care in most any seaming operation, it is very easy to so alter the screen surface near the seams being formed as to have same visible from the audience area. Applicant's method avoids such difficulties.

A securing tape which has been found to satisfy these requirements may be provided as follows: A woven reinforcing fabric preferably composed in part or entirely of fibre glass has been coated with a black vinyl plastic and the tape was further coated on its front face, that is, on the side which is to be placed against the sheet material, with an air drying plastic cement like that mentioned above, and with a black colorant, such as charcoal, mixed thoroughly therein. When the fabric has been so coated and the cement has thoroughly dried, the front surface should be sprayed with surface dulling hydrated silica base material like that mentioned above and allowed to dry. Thus all specular reflection from the front face of the prepared tape will be eliminated.

Figure 11:
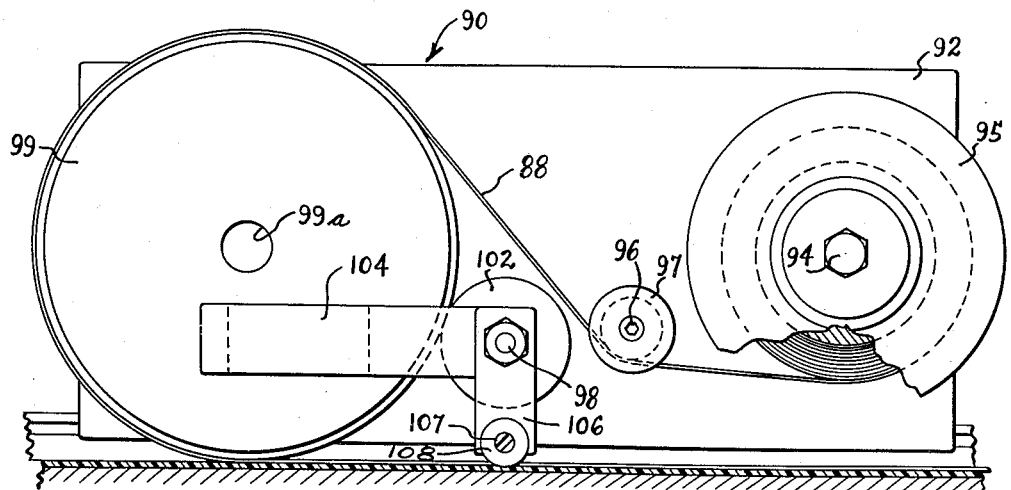
Figure 12:
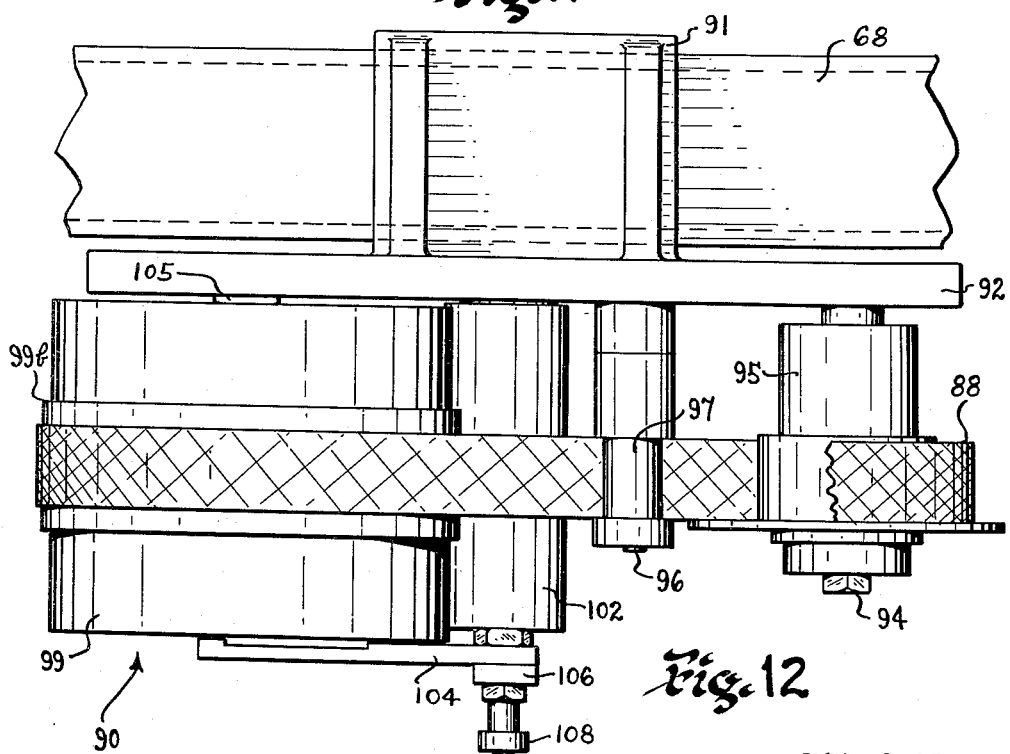
FIG. 12 is a plan view of said sealing and guide means.

The prepared tape, such as that indicated at 88 in FIGS. 10–12, is then ready for application to the elongated cement-coated surfaces of the strips 12 and 14. This can best be accomplished by use of a sealing device like that indicated generally by the numeral 90 in the same figures. This device 90 comprises a slidable base member 91 arranged to be guided by the straight edge 68 mentioned above, and carried on this base member is a rigid vertical plate 92. Plate 92, in turn, has three spaced shafts or equivalent mounting means 94, 96 and 98 extending horizontally therefrom. Means 94 has a flanged spool or bobbin-like member 95 rotatably mounted thereon and this member 95 is arranged to locate a coil of the prepared tape 88 in correct alignment so that the free end of this tape may be drawn downwardly under a fixed polished channeled friction shoe 97 carried by means 96. The tape then passes upwardly and around the greater part of the periphery of a large pressure roller 99.

Pressure roller 99, it should be noted, is "free-floating" and is solid except for a central transverse bore 99a which is provided therein for lifting purposes. The roller furthermore is of appreciable width and diameter (for example approximately 4.5" diameter and approximately 3.5" wide) and is made of metal such as iron or aluminum so as to have good or high heat conductivity. Thus, the roller 99 has considerable weight and heat-storing capacity and when heated in an oven to 475° F., for example, will provide sufficient steady heat for performing its intended function in forming at least one long seam, in the present method, after each heating thereof.

The pressure roller 99 has a centrally located circumferential band or stepped portion 99b thereon which is somewhat wider than the tape 88 and about which the tape is wrapped when the roller 99 is located in its operative position in the device 90. In this operative position, the roller (which contacts only the tape and never contacts the strips of screen surface forming sheet material) is against an anti-friction drum 102 rotatably carried upon the fixed shaft 98. Also carried by the shaft 98 are a pair of fixed arms 104 and 106. The arm 104 extends forwardly sufficiently at the outer side of the roller 99 so as to cooperate with abutment means 105 on the plate 92 in confining the pressure roller to straight-line travel as it is caused to roll forwardly due to the forward travel of the sealing device 90. The other fixed arm 106 extends downwardly from the shaft 98 and carries a stub shaft 107 and small roller 108 near its lower end which is arranged, as shown in FIG. 10, to engage the back of the sheet material and thus prevent downward tilting of the sealing device.

After the elongated areas of the strips 12 and 14 next to the joint 67 have been coated with the cement, as mentioned above, and the cement has thoroughly dried, the sealing device 90 with a prepared coil of tape positioned thereon, as shown in FIG. 11, will be caused to move slowly from one end of the prepared strips to the other; being, of course, at such time guided in a straight line by the straight edge 68. The preferred rate of travel of the sealing device is approximately three feet in each ten seconds. The temperature to which the pressure roller is heated and the rate at which the prepared tape is preheated and applied to the cement-coated surfaces of the strips is very important for if this part of the process is not correctly carried out the completed screen may not be acceptable. Since the roller 99 is preferably preheated to 475° F. each time a seam is to be formed and since all areas of the tape are in contact with the heated roller for a half revolution or more of the roller immediately before being pressed against the strips 12 and 14, the plastic of the tape wall be softened and the tape will fuse to the strips as it comes into contact therewith. On the other hand, since the device 90 is traveling forwardly at the rate of three feet in every ten seconds and since, in effect, little more than a line contact of the heat and pressure is being momentarily applied by the roller 99 to the tape after it has come into contact with the sheet material, no appreciable amount of heat will enter the sheet material. Thus, no detrimental effect will be produced thereon. It is interesting to note at this time that a heated flat iron or the like will not give satisfactory result since by the time the plastic of the tape has softened for fusion the heat from the iron will have also penetrated into the sheet material so as to soften and alter the front surface thereof.

By the use of a roller of such a mass and with such heat-storing capacity, by preheating this roller to the specified temperature and by moving the sealing device forwardly over the sheet material at the specified rate, it is possible to raise the temperature of the vinyl-coated tape to a proper temperature and to apply same at a suitable pressure to the cement-coated face of the strips of flexible sheet material so as to obtain, on the one hand, a good and permanent adhesion between the strip and tape and, on the other hand, not have this operation of forming a seam between strips alter the front surface of the strips in any apparent way. Neither will the areas of the strip near the seams thus formed appear shiny or discolored, nor will the perforations at such locations look different. Furthermore, in no way will the front surface configuration for control of cross-illumination at the seam thus formed appear in any way altered.

An important condition obtained by screens of the above-described type is that of resisting to a specified degree combustion. For example, in order to be used in public theaters, certain of stricter States' laws require that when the bottom edge of a vertically suspended piece of material is subjected to an open flame, such as a Bunsen burner flame for twelve seconds, that the screen extinguish itself within one second after the burner is removed and that no more than a 3½ inch charred length will be left along the bottom edge of the screen. The improved screen of the present invention more than satisfies these strict requirements.

The foregoing description has been primarily directed to flexible screens intended to be laced to and supported in tension by outer peripheral frames. It should be here noted, nevertheless, that a screen formed in a similar manner may be used, if desired, as the front surface forming part of a rigid outdoor drive-in type of theater screen. Such a screen, of course, would not ordinarily be provided with sound perforation and, accordingly, could be cemented directly to the backing material of such a rigid type of screen.

I claim:

1. A flexible projection screen adapted to be held in a tensioned position within an outer peripheral supporting frame, said screen comprising a plurality of elongated flexible vertically extending strips of a vinyl thermoplastic sheet material, the front surface of each strip of sheet material being white and of a highly reflective light-diffusing character, said strips being arranged in side-by-side relation and having the adjacent side edges of adjacent strips disposed in abutting relation to each other, a very large number of relatively small evenly spaced openings extending through each of said strips and uniformly dispersed relative to adjacent openings throughout the entire area of each of said strips for the transmission of sound therethrough, a narrow elongated flexible non-stretchable ribbon of a vinyl thermoplastic material having a dull black front surface fixedly secured to each pair of adjacent strips on the rear surface thereof by a relatively high molecular weight air-dried polyvinyl resin cement therebetween, and in such a manner as to overlie each pair of abutting edge portions and form a butt joint which extends throughout the entire length of the adjacent strips, each of said strips of vinyl sheet material having an embossed front surface embodying vertically disposed straight parallel outwardly projecting V-shaped ribs, each pair of adjacent ribs being spaced apart a mean distance ranging between approximately .06 and .07 of an inch and providing therebetween relatively flat vertically disposed light-reflecting surfaces, each V-shaped rib extending outwardly from the front surface of said sheet material a distance ranging from between approximately .025 and .031 of an inch, and each rib being defined by a pair of surfaces which are inclined to each other so as to include an acute angle of relatively small size therebetween, the ribs of adjacent strips being parallel to each other and the space between the ribs on opposite sides of each butt joint being equal to the space between any pair of adjacent ribs on said strips.

2. A projection screen as defined in claim 1 having a surface dulling coating of hydrated silica upon the front surface thereof.

References Cited in the file of this patent

UNITED STATES PATENTS

| | | |
|---|---|---|
| 1,043,988 | Williams | Nov. 12, 1912 |
| 1,515,427 | Bouin | Nov. 11, 1924 |
| 1,747,425 | Cawley | Feb. 18, 1930 |
| 1,856,739 | Alt et al. | May 3, 1932 |
| 2,238,365 | Hurley | Apr. 15, 1941 |
| 2,366,761 | Walker | Jan. 9, 1945 |
| 2,367,725 | Lindh et al. | Jan. 23, 1945 |
| 2,726,222 | Palmquist et al. | Dec. 6, 1955 |
| 2,909,204 | Somerville | Oct. 20, 1959 |

OTHER REFERENCES

Modern Plastics, "Vinyl Movie Screens," Modern Plastics, vol. 28, No. 7, March 1951, page 63.

I.P. article, "What's New in Projection Screens," International Projectionists, vol. 27, No. 4, April 1952, pages 5 and 6.